United States Patent [19]

Burglin et al.

[11] Patent Number: 4,752,298
[45] Date of Patent: Jun. 21, 1988

[54] STORAGE-STABLE FORMULATIONS OF WATER-INSOLUBLE OR SPARINGLY WATER-SOLUBLE DYES WITH ELECTROLYTE-SENSITIVE THICKENERS: POLYACRYLIC ACID

[75] Inventors: Marc Burglin, Battenheim, France; Roland Putzar, Hofstetten, Switzerland

[73] Assignee: Ciba-Geigy Corporation, Ardsley, N.Y.

[21] Appl. No.: 931,387

[22] Filed: Nov. 17, 1986

[30] Foreign Application Priority Data

Nov. 25, 1985 [CH] Switzerland .......................... 5020/85

[51] Int. Cl.$^4$ ............................................. C09B 67/46
[52] U.S. Cl. ........................................... 8/527; 8/555; 8/558
[58] Field of Search ........................... 8/527, 555, 558

[56] References Cited

U.S. PATENT DOCUMENTS

| | | | |
|---|---|---|---|
| 3,067,053 | 12/1962 | Tarantino | 106/308 |
| 4,265,631 | 5/1981 | Becker | 8/471 |
| 4,297,100 | 10/1981 | Koci et al. | 8/527 |

FOREIGN PATENT DOCUMENTS

| | | |
|---|---|---|
| 638239 | 9/1983 | Switzerland . |
| 1537597 | 1/1979 | United Kingdom . |
| 2004922 | 4/1979 | United Kingdom . |
| 1551829 | 9/1979 | United Kingdom . |

Primary Examiner—A. Lionel Clingman
Attorney, Agent, or Firm—Edward McC. Roberts; Meredith C. Findlay

[57] ABSTRACT

The invention relates to storage-stable aqueous formulations of water-insoluble or sparingly water-soluble solids which contain an electrolyte-sensitive thickener in addition to a dispersant.

During storage, even for considerable periods of time, these formulations form no sediment and can be diluted by stirring in a small amount of electrolyte (e.g. a salt) and are then ready for use.

15 Claims, No Drawings

STORAGE-STABLE FORMULATIONS OF WATER-INSOLUBLE OR SPARINGLY WATER-SOLUBLE DYES WITH ELECTROLYTE-SENSITIVE THICKENERS: POLYACRYLIC ACID

The present invention relates to storage-stable formulations of water-insoluble or sparingly water-soluble solids and, where said solids are dyes, to the use thereof for dyeing and printing leather, wood, paper or, in particular, textile materials, which formulations are first converted into a dilute form, before use, by addition of electrolyte, and can then be handled in the same manner as known liquid formulations.

Liquid formulations such as solutions or dispersions have a number of advantages over powdered formulations, e.g. no dust formation, no wetting problems caused by lump formation, no specky dyeings resulting from insufficiently dissolved or dispersed dye particles and, last but not least, the ease with which the liquid formulations can be added to the dyebath in automated systems.

However, the shelf life of liquid formulations is often quite unsatisfactory on prolonged storage as compared with correspondingly formulated powders or granulates. For example, in the case of dyes a change of colour in the vertical profile of the dye container is often observed, extending even to the formation of a sediment which can only be stirred with considerable difficulty. Insufficiently dispersed dye formulations, however, not only give specky dyeings but, when used in textile printing, also result in clogging of the printing screens.

In the past, a multiplicity of widely different formulations has been developed to overcome this problem. Up to now, the solution has been sought in a selection of specific dispersants or mixtures of dispersants. The dispersants employed have been in particular anionic dispersants such as naphthalenesulfonic acid/formaldehyde condensates, lignosulfonates, alkyl- and arylsulfonates or nuclear-sulfonated aromatic polyethers (DE-A-22 44 777). Non-ionic dispersants of the ethylene oxide/propylene oxide copolymer type or the large group of ethylene oxide/propylene oxide adducts, as well as mixtures of anionic and non-ionic dispersants, have also been used as assistants for the preparation of storage-stable disperse dye formulations and pigment preparations (q.v. for example DE-A-27 57 330, DE-B-25 02 839 or GB-A-20 37 819).

Depending on the dye, however, the results obtained are not always satisfactory and, where the dyes have a particularly strong propensity to sedimentation, troublesome and time-consuming preliminary experiments have to be carried out to select the suitable dispersants.

It has now been found that it is possible to prepare storage-stable formulations of solids in simple manner by adding to the aqueous, dispersant containing dispersion of said solids an electrolyte-sensitive thickener that increases the viscosity of the dispersion to such a degree that virtually no more sedimentation occurs. These formulations can then be stored trouble-free unchanged for several months and, before use, merely require the addition of a small amount of electrolyte to neutralise the action of the thickener almost completely. Suitable electrolytes are organic as well as inorganic salts, for example alkali metal halides or alkali metal sulfates such as sodium chloride or sodium sulfate, and also the alkali metal salts of anionic dispersants or alkali metal salts of dispersant acids in admixture with inorganic salts. The dilute solids formulation can be readily added to the dyebath and also used very satisfactorily in automated metering systems.

Accordingly, the present invention relates to storage-stable aqueous formulations of water-insoluble or sparingly water-soluble solids of any particle size, advantageously <50 $\mu$m, which contain an electrolyte-sensitive, preferably synthetic, thickener in addition to a dispersant.

The phenomenon of electrolyte sensitivity of synthetic thickeners is known. In view of this phenomenon, formulations of low salt content that are compatible with such thickeners and which can also be processed to suitable printing pastes have been prepared. The formulations described in this specification, however, are not to be confused with printing pastes. To the contrary, they are characterised by a much higher solids content compared with conventional printing pastes and are concentrated formulations (commercial formulations) which are diluted before application and then used, for example, for the preparation of dyebaths, padding liquors or also printing pastes.

The viscosity of the formulations of this invention is conveniently in the range from 200 to $1 \cdot 10^6$ mPa·s, preferably from $1 \cdot 10^3$ to $1 \cdot 10^6$ mPa·s, and is in particular in the range from 500 to $1 \cdot 10^4$ mPa·s and, most preferably, from $1 \cdot 10^3$ to $1 \cdot 10^4$ mpa·s.

Suitable electrolyte-sensitive synthetic thickeners are in particular the following polymers:

polyacrylic acids/polyacrylates having a molecular weight of $1 \cdot 10^5$ to $1 \cdot 10^7$;

polyacrylamides or polymethacrylamides or homo- or copolymers of acrylamide and methacrylamide or acrylic acid having a molecular weight of $1 \cdot 10^5$ to $1 \cdot 10^7$;

copolymers of maleic anhydride and ethylene having a molecular weight of $1 \cdot 10^3$ to $1 \cdot 10^7$.

Preferred polymers are:

polyacrylic acids/polyacrylates having a molecular weight of $5 \cdot 10^5$ to $6 \cdot 10^6$;

polyacrylamides or polysethacrylamides or homo- or copolymers of acrylamide and methacrylamide or acrylic acid having a molecular weight of $1 \cdot 10^6$ to $4 \cdot 10^6$;

copolymers of maleic anhydride and ethylene having a molecular weight of $8 \cdot 10^3$ to $1 \cdot 10^6$.

The polymers can be partially or completely crosslinked. Mixtures of the above thickeners can also be used. The polymers are commercial products which are known to the skilled person.

Particularly useful thickeners are the polymeric acrylic acids. having a molecular weight of $7 \cdot 10^5$ to $2 \cdot 10^6$. Even when used in low concentration, these thickeners give a viscous formulation of the desired viscosity. It will be readily understood that the storage-stable formulations described herein can contain not only the thickeners specifically referred to, but may in principle contain any thickener whose viscosity increasing effect can be neutralised by the addition of electrolytes.

The thickener will normally be added in an amount of 0.001 to 10% by weight, preferably 0.01 to 10% by weight and, most preferably, 0.1 to 5% by weight, based on the formulation. Depending on the solid, formulations of sufficiently high viscosity are not always obtained with amounts of thickener lower than 0.001% by weight, whereas amounts above 10% by weight generally do not result in any further enhanced stability.

Examples of water-insoluble and sparingly water-soluble solids are dyes, UV absorbers, textile and paper auxiliaries, pesticides, photochemicals, leather chemicals, plastics as well as additives in pure or diluted form. Dyes are in particular disperse and vat dyes of different classes. The disperse dyes are e.g. nitro dyes, aminoketone dyes, ketone-imine dyes, methine dyes, nitrodiphenylaminoketone dyes, quinoline dyes, aminonaphthoquinone dyes, coumarin dyes and, in particular, anthraquinone dyes and azo dyes such as monoazo and disazo dyes.

Vat dyes are e.g. indigoid dyes, anthraquinoid dyes such as indanthrene, as well as sulfur dyes and leuco-vat ester dyes.

Solids will also be understood as comprising fluorescent whitening agents, for example water-insoluble and sparingly water-soluble fluorescent whitening agents of the following compound classes: stilbenes, coumarins, benzocoumarins, pyrenes, pyrazines, pyrazolines, oxazines, mono- or dibenzoxazolyl or mono- or dibenzimidazolyl compounds, aryltriazole and v-triazole derivatives and naphthalic acid imide.

The term "water-insoluble solids" also comprises in the context of this invention, inter alia, the large group of the organic and inorganic pigments, e.g. azo pigments, phthalocyanine pigments, isoindoline or dioxazine pigments and also higher molecular azo condensation pigments. Examples of inorganic pigments are white pigments and iron oxide chromate pigments.

In addition to containing the solid and the thickener, the formulations contain a dispersant. Suitable dispersants are non-ionic, amphoteric, anionic and cationic dispersants. Non-ionic dispersants are preferred, e.g. ethylene oxide adducts of the class of adducts of ethylene oxide with (a) saturated and/or unsaturated $C_6$–$C_{20}$ fatty alcohols; or
(b) $C_4$–$C_{12}$ alkylphenols; or
(c) saturated and/or unsaturated $C_{14}$–$C_{20}$ fatty amines; or
(d) saturated and/or unsaturated $C_{14}$–$C_{20}$ fatty acids.

Specific ethylene oxide adducts are:
(a) polyadducts of saturated and/or unsaturated $C_6$–$C_{20}$ fatty alcohols with 5 to 30 moles of ethylene oxide;
(b) polyadducts of $C_4$–$C_{12}$ alkylphenols with 5 to 20 moles, preferably 8 to 15 moles, of ethylene oxide;
(c) polyadducts of saturated and/or unsaturated $C_{14}$–$C_{20}$ fatty amines with 5 to 20 moles of ethylene oxide;
(d) polyadducts of saturated and/or unsaturated $C_{14}$–$C_{20}$ fatty acids with 5 to 20 moles of ethylene oxide.

Mixtures of the ethylene oxide adducts of (a) (b), (c) and (d) with one another can also be used. These mixtures are obtained by mixing individual adducts or direct by ethoxylating a mixture of compounds from which the adducts are derived.

Instead of using the pure ethoxylates, it is also possible to use alkoxylates which are obtained by reacting the compounds mentioned in (a) to (d) with ethylene oxide and propylene oxide.

Suitable saturated and/or unsaturated fatty alcohols (a) are dodecanol, palmityl alcohol, stearyl alcohol, oleyl alcohol or tallow fatty alcohols, preferably hexanol, 2-ethylhexanol and decanol.

The alkylphenols in (b) are butylphenol, hexylphenol, and preferably isooctylphenol, p-tert-octylphenol, nonylphenol and dodecylphenol.

In addition to stearylamine and palmitylamine, a suitable fatty amine in (c) is, in particular, oleylamine.

Examples of saturated and/or unsaturated fatty acids in (d) are palmitic acid, in particular stearic acid and oleic acid.

Because of their good dispersing action and excellent compatibility with synthetic thickeners, it is preferred to use ethylene oxide/propylene oxide block polymers, in particular types containing a central propylene oxide unit of formula

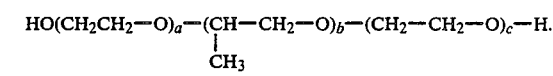

The sum of the indices a and c is a number between 200 and 400 and the index b is a number between 20 and 100. These polymers thus have a molecular weight in the range from 9000 to 23,500. Dispersants of this type are commercially available.

Further, it is also possible to use mixtures of dispersants which, preferably besides containing a non-ionic dispersant, additionally contain amphoteric, anionic or cationic dispersants. In all cases, it must be ensured that the amount of electrolyte does not result in an impairment of the desired thickening effect.

Effective anionic surfactants are condensates of aromatic sulfonic acids and formaldehyde, for example condensates of formaldehyde and naphthalenesulfonic acids or of formaldehyde, naphthalenesulfonic acid and benzenesulfonic acid, or a condensate of crude cresol, formaldehyde and naphthalenesulfonic acid. Other suitable anionic surfactants are in particularly lignosulfonates, e.g. those obtained by the sulfite or kraft process. They are preferably products which are partially hydrolysed, oxidised, or desulfonated, and are fractionated by known methods, e.g. according to molecular weight or degree of sulfonation. Mixtures of sulfite- and kraft-lignosulfonates are also very effective. Particularly suitable lignosulfonates are those having an average molecular weight in the range from 1000 to 80,000, a content of active lignosulfonate of at least 80%, and preferably a low content of polyvalent cations. The degree of sulfonation can vary within wide limits. The ratio of carbon to organically bound sulfur is e.g. from 9:1 to 55:1. Products having a low degree of sulfonation are preferred. Further preferred anionic dispersants are dialkyl sulfosuccinates, the alkyl moieties of which are branched or unbranched and each contain 3 to 10 carbon atoms, e.g. dipropyl sulfosuccinate, diisobutyl sulfosuccinate, diamyl sulfosuccinate, bis(2-ethyl-n-hexyl) sulfosuccinate or dioctyl sulfosuccinate.

Other suitable anionic surfactants are sulfated or sulfonated fatty acids, or fatty acid esters of fatty acids of 10 to 22, preferably of 12 to 18, carbon atoms, e.g. sulfated oleic acid, elaidic acid or ricinolic acid or the lower alkyl esters thereof, e.g. the ethyl, propyl or butyl esters thereof. Also very suitable are the corresponding sulfated or sulfonated oils, e.g. olive oil, colza oil and, in particular, castor oil.

The anionic surfactants are normally in the form of their alkali metal salts, ammonium salts, or water-soluble amine salts. It is advantageous to use compounds having a low content of electrolytes.

Examples of suitable cationic dispersants are quaternary ammonium compounds containing higher alkyl radicals and having the formula

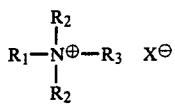

wherein the substituents $R_1$ to $R_3$ and the symbol $x^\ominus$ are defined as follows:

$R_1$ is a saturated and/or unsaturated $C_8-C_{22}$ alkyl radical, $R_2$ is a $C_1-C_4$ alkyl radical or a polyalkylene oxide chain containing 3 to 30 ethylene oxide and/or propylene oxide units or ethylene oxide and styrene oxide units, $R_3$ is a $C_1-C_4$ alkyl radical which is unsubstituted or substituted by a hydroxy, methoxy or ethoxy group or by a carbamoyl or phenyl radical, $x^\ominus$ is the anion of an organic or inorganic acid, e.g. the chloride, bromide, sulfate or methosulfate anion.

Such compounds are known or can be obtained by known methods, for example by reacting a fatty amine or a mixture of fatty amines, e.g. coconut fatty amine, with ethylene oxide and/or propylene oxide and subsequently quaternising the resultant alkoxylate, e.g. with dimethyl sulfate (q.v. H. Stache, Tensid-Handbuch (Handbook of Surfactants), Carl Hanser Verlag 1981).

Representative examples of fatty amine alkoxylates are:

the adduct of 8 moles of ethylene and 1 mole of tallow fatty amine, quaternised with chloroacetamide, the adduct of 30 moles of ethylene and 1 mole of a $C_{18}-C_{22}$ fatty amine, quaternised with dimethyl sulfate, the adduct of 30 moles of ethylene oxide and 1 mole of laurylamine, quaternised with dimethyl sulfate, the adduct of 15 moles of ethylene oxide and 1 mole of laurylamine, quaternised with dimethyl sulfate, the adduct of 15 moles of ethylene oxide and 1 mole of stearylamine, quaternised with dimethyl sulfate, the polyadduct of 1 mole of styrene oxide and 30 moles of ethylene oxide with 1 mole of stearylamine, quaternised with dimethyl sulfate, the polyadduct of 6 moles of propylene oxide and 30 moles of ethylene oxide with 1 mole of caprylamine, quaternised with dimethyl sulfate, the polyadduct of 1 mole of styrene oxide and 20 moles of ethylene oxide with 1 mole of stearylamine, quaternised with dimethyl sulfate.

In addition to the purely anionic and cationic dispersants, it is also possible to use amphoteric dispersants. Typical examples are:

the ammonium salt of the sulfated polyadduct of 2.5 moles of ethylene oxide and 1 mole of tallow fatty amine, the ammonium salt of the sulfated polyadduct of 4 moles of ethylene oxide and 1 mole of tallow fatty amine, the ammonium salt of the sulfated polyadduct of 6 moles of ethylene oxide and 1 mole of tallow fatty amine, the ammonium salt of the sulfated polyadduct of 8 moles of ethylene oxide and 1 mole of tallow fatty amine, the ammonium salt of the amphoteric sulfated polyadduct of 8 moles of ethylene oxide and 1 mole of tallow fatty amine, quaternised with chloroacetamide, the ammonium salt of the amphoteric sulfated polyadduct of 30 moles of ethylene oxide and 1 mole of a $C_{18}-C_{22}$ fatty amine, quaternised with dimethyl sulfate.

Further effective dispersants are those selected from the group of amine oxides. Depending on the pH of the dyebath, such compounds have non-ionic (neutral to basic liquor) or cationic (acid liquor) character. Examples of suitable amine oxides are:

N-dodecyl-N,N-dimethylamine oxide
N-myristyl-N,N-dimethylamine oxide
N-dodecyl-N,N-di-2-hydroxyethylamine oxide
N-hexadecyl-N,N-di-2-hydroxyethylamine oxide
N-hexadecyl-N,N-dimethylamine oxide
N-oleyl-N,N-di-2-hydroxyethylamine oxide
N-stearyl-N,N-di-2-hydroxyethylamine oxide
N-coconut fatty acid amidopropyl-N,N-dimethylamine oxide
N-tallow fatty acid amidopropyl-N,N-dimethylamine oxide.

The formulations may contain still further assistants such as hydrotropic agents, e.g. urea, or microbicides, e.g. chloroacetamide, fungicides, antifoams or chelating agents, as well as compounds for regulating the pH.

The formulations preferably have the following composition:

10 to 60% by weight, preferably 20 to 50% by weight, of solid, preferably a dye of low salt content that has been deionised by means of a membrane separation process (DE-A-32 35 747), 0.5 to 25% by weight, preferably 2 to 15% by weight, of a dispersant or mixture of dispersants, 0.001 to 5% by weight, preferably 0.01 to 1% by weight, of a synthetic thickener, 5 to 20% by weight of a humectant, 20 to 70% by weight of water, and also optionally contain 0.1 to 5% by weight of an antifoam, a hydrotropic agent, a chelating agent and/or, for adjusting the pH and thus the viscosity, a carboxylic acid, e.g. acetic acid, or an alkali metal hydroxide, e.g. sodium hydroxide, or ammonia.

A particularly preferred composition contains, instead of the above ingredients, 0.5 to 15% by weight, preferably 2 to 10% by weight, of a non-ionic dispersant, 0.1 to 10% by weight, preferably 0.5 to 3% by weight, of an anionic dispersant, and the above described additives.

The present invention further relates to a process for the preparation of the formulations, which comprises subjecting the solid, if it has not been obtained direct in finely dispersed form, to a wet grinding after the synthesis, in the presence of a non-ionic, amphoteric, cationic or anionic dispersant or of a mixture of such dispersants. Grinding is effected e.g. in a stirred ball mill, sand mill or pin-disc mill. Before grinding and/or immediately after, the solid is preferably freed from inorganic salts and low molecular by-products and, if it is a dye, adjusted to the required tinctorial strength by concentration. Subsequently, one or more of the assistants cited above may be added The thickener can be added before or after grinding, usually in the form of a homogeneous aqueous solution. It is, of course, also possible to start from commercially available liquid formulations, for example those described in DE-B-28 50 482, and merely to add thereto the requisite amount of thickener.

The invention is illustrated by the following Examples, in which parts and percentages are by weight.

EXAMPLE 1

100 parts of a dye formulation of the following composition:
31.6 parts of the disperse dye of formula

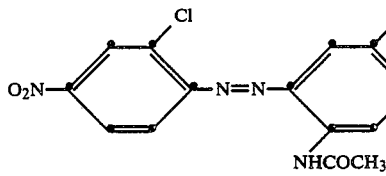

1.6 parts of oxylignosulfonate with a carbon:sulfur ratio of ~33:1,
4.1 parts of an ethylene oxide/propylene oxide block polymer having a molecular weight of c. 16,000,
17.1 parts of propylene glycol,
1.5 parts of microbicide, and
44.1 parts of water,
are homogenised with 0.3 part of polyacrylic acid (molecular weight c. $1 \cdot 10^6$) in a stirred reactor equipped with an anchor stirrer. The polyacrylic acid is added in the form of a 1.5% aqueous solution, whereupon the viscosity increases from an initial 140 mPa·s to 1300 mPa·s. After storage or centrifugation as time acceleration test, the thickened liquid formulation remains perfectly homogeneous. No sediment forms, nor do any colour differences occur in the container (samples taken from the surface and the bottom).

Shortly before the formulation is used, 2.5 parts of the sodium salt of a naphthalenesulfonic acid/formaldehyde condensate with a c. 25% content of sodium sulfate are stirred in to give, after a few minutes, a homogeneous liquid formulation which, with a viscosity of 150 mPa·s, has almost the same viscosity as the unthickened formulation. The formulation can be readily metered and can be added e.g. direct to a dyebath.

EXAMPLE 2

50 parts of the dilute dye formulation of Example 1 are dispersed in 1000 parts of water. A polyester/cotton fabric is padded to a pick-up of 70% with this liquor, then subjected to an intermediate drying and to a thermosol treatment at 210° C. A level, non-specky, red dysing is obtained.

EXAMPLE 3

The same formulation as in Example 1 is thickened with 0.43 part of polyacrylic acid (molecular weight c. $7.5 \cdot 10^5$) and adjusted with triethanolamine to pH 7.3. The viscosity increases from 150 mPa·s to 3000 mPa·s.

EXAMPLE 4

60 g of the formulation of low dispersant content comprising
33.4% of the disperse dye of formula

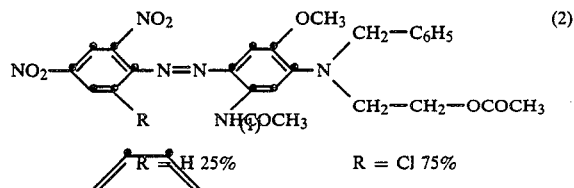

1.3% of oxylignosulfonate
3.3% of block polymer
20.0% of humectant (1,2-propylene glycol)
42.0% of water and
11.5 g of a 3% polyacrylic acid solution (mol. wt. $7.5 \cdot 10^5$) and
11.5 g of water
are adjusted to pH 7.1 with NaOH solution.

The viscosity of the formulation of low dispersant content increases from 20 mPa·s to 1000 mPa·s. The particle size distribution is from 0.1 to 5 μm. The viscosity is 1460 mPa·s if triethanolamine is used as alkali and the pH is adjusted to 7.5.

Virtually no sedimentation occurs after storage for several months. The thickened formulation remains homogeneous.

The viscosity reverts to the original range by stirring in 2% of sodium naphthalenesulfonate condensate, based on the liquid formulation.

EXAMPLE 5

100 parts of the dilute dye formulation of Example 4 are dispersed in 900 parts of water. A polyester/cellulose fabric is padded to a pick-up of 70% with this liquor, then subjected to an intermediate drying and to a thermosol treatment at 210° C. A level, non-specky, navy blue dyeing is obtained.

EXAMPLE 6-8

The excellent effectiveness of the thickener system of this invention becomes evident in unground coarse dispersions (crude concentrates) with a particle size distribution from 1 to 50 μm and which have been concentrated from synthesis suspensions by membrane processes. The following Table illustrates this.

TABLE

| | Crude concentrate | Thickener polyacrylic acid: PA polysaccharide: PS | pH adjusted with triethanolamine (TEA) | Viscosity (mPa.s) without electrolyte | Viscosity (mPa.s) with electrolyte |
|---|---|---|---|---|---|
| (6) | 37% of disperse dye of formula (3) | 0.35% PA | 7.3 | 1900 | 100 |
| | 4% of sodium lignosulfonate | 0.24% PS | 7.5 | 1100 | 1080 |
| (7) | 27% of disperse dye of formula (4) | 0.3% PA | 7.3 | 850 | 50 |
| | 3% of sodium lignosulfonate | 0.2% PS | 7.5 | 960 | 920 |

| | Thickener | pH adjusted with | Viscosity (mPa.s) | |
|---|---|---|---|---|
| Crude concentrate | polyacrylic acid: PA polysaccharide: PS | triethanolamine (TEA) | without electrolyte | with electrolyte |
| (8) 41% of disperse dye of formula (2) 4% of sodium lignosulfonate | 0.35% PA | 7.1 | 1300 | 80 |

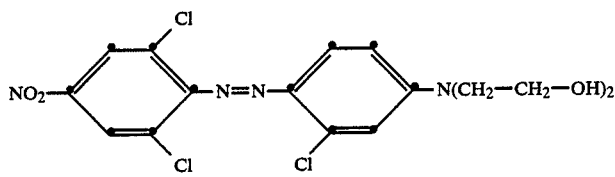

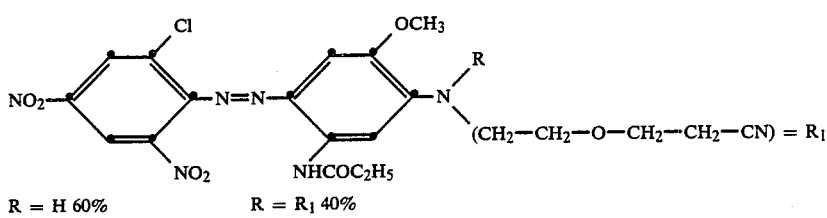

R = H 60%   R = R$_1$ 40%

An electrolyte-sensitive thickener based on polyacrylic acid was compared with an electrolyte-insensitive thickener based on a polysaccharide. The electrolyte was again the condensate of sodium naphthalenesulfonate (2%, based on the suspension).

In contrast to the polyacrylic acid type, the dispersion thickened with the polysaccharide thickener could no longer be diluted. Despite the very coarse dispersion, no sediment formed after storage for several weeks. The unthickened suspension, on the other hand, had separated completely into two phases, with the sediment containing the entire solid as a hard layer. After the polyacrylic acid suspension had been diluted, it was possible to process it further readily.

EXAMPLE 9

15 parts of the red vat dye of formula

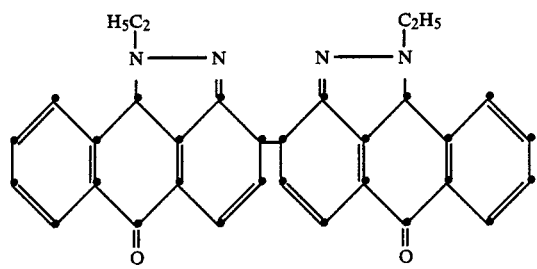

3 parts of a triethanolamine lignosulfonate
2 parts of a non-ionic block polymer
10 parts of ethylene glycol
0.17 part of a polyacrylic acid (mol. wt. 4·10$^6$) as thickener, and
69.83 parts of H$_2$O
are ground in an attrition mill until the particle size of the dye is in the range from 0.1–5 μm. After it has been discharged from the mill, the liquid formulation has a viscosity of 1400 mPa·s, measured with a Brookfield viscosimeter at 30 rpm and at 20° C.

The same formulation, without thickener, has a viscosity of 290 mPa·s. In contrast to the thickened formulation, the coarse particles form a sediment on storage, so that substantial differences in colour strength occur in the vertical profile.

The thickened homogeneous liquid formulation can be diluted to a viscosity of 310 mPa·s after storage for any length of time by simply stirring in 1% of sodium naphthalenesulfonate condensate. Use of the formulation in the dyehouse is thus ensured, even for metered addition in automated systems.

EXAMPLE 10

100 parts of a liquid formulation of a fluorescent whitening agent of the following composition:
20 parts of fluorescent whitening agent of formula

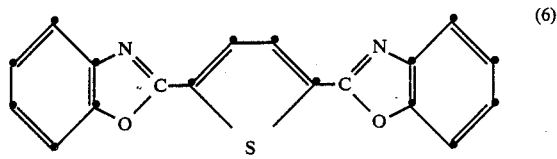

3 parts of a non-ionic dispersant such as a nonylphenol ethoxylate (HLB 15-18) or of a corresponding block polymer, and
67 parts of water
are ground in an attrition mill to a particle size of 0.1 to 10 μm.
To this formulation are then added
10 parts of a 2% stock solution of a polyacrylic acid (mol. wt. 750,000) in a stirred glass beaker until the dispersion is homogeneous. The viscosity increases from 70 mPa·s to 1100 mPa·s.

No undesirable sedimentation of the thickened liquid formulation occurs during storage for several months. The active substance remains vertical in homogeneous dispersion.

Shortly before use, 0.5 part of NaCl is stirred into the formulation to give a homogeneous, readily pourable and pumpable form having the original viscosity of the unthickened formulation.

A liquid formulation of the fluorescent whitening agent having a viscosity of 2200 mPa·s is obtained by using 52 instead of 67 parts of water and 25 instead of 10 parts of the 2% stock solution of polyacrylic acid. Addition of 2% of NaCl restores the viscosity to 65 mPa·s.

EXAMPLE 11

100 parts of a liquid formulation of a UV absorber are prepared as follows:
35 parts of the absorber of formula

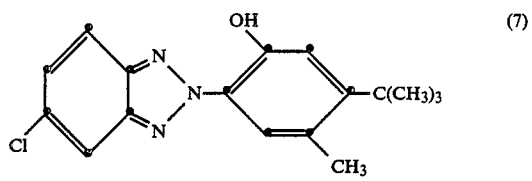 (7)

2 parts of an alkylphenol ethoxylate or of a corresponding block polymer having a HLB value of about 18, and
58 parts of water
are ground in a corundum disc mill to a particle size of 1–20 μm. At the resultant viscosity of 100 mPa·s, the larger particles tend to deposit during storage. For this reason, 5 parts of a 1% stock solution of a polyacrylic acid (mol. wt. $4 \cdot 10^6$) are added to a glass beaker and stirred until the thickener is homogenised. The viscosity rises to 2000 mPa·s.

No undesirable sedimentation of the active substance occurs during storage for several months. The dispersion remains homogeneous and can be readily diluted shortly before use by stirring in 0.5 part of the sodium salt of a naphthalenesulfonic acid/formaldehyde condensate for a few minutes. The original viscosity so obtained ensures that the formulation can be readily added to a dyebath.

What is claimed is:

1. A storage-stable aqueous formulation of a water-insoluble or sparingly water-soluble dye which dye has a particle size of less than 50 millimicrons, which formulation contains the dye, an electrolyte-sensitive thickener selected from the group consisting of polyacrylic acid having a molecular weight $1 \cdot 10^5$ to $1 \cdot 10^7$, a polyacrylamide, polymethacrylamide or a homo- or copolymer of acrylamide and methacrylamide or acrylic acid having a molecular weight of $1 \cdot 10^5$ to $1 \cdot 10^7$, or a copolymer of maleic anhydride and ethylene having a molecular weight of $1 \cdot 10^3$ to $1 \cdot 10^7$, and mixtures of such thickeners.

2. A storage-stable aqueous formulation of a water-insoluble or sparingly water-soluble dye having a particle size of less than 10 millimicrons, which formulation contains the dye, an electrolyte-sensitive thickener selected from the group consisting of polyacrylic acid having a molecular weight of $5 \cdot 10^5$ to $6 \cdot 10^6$, polyacrylamide, polymethacrylamide or homo- or copolymer of acrylamide and methacrylamide or acrylic acid having a molecular weight of $1 \cdot 10^6$ to $4 \cdot 10^6$, or a copolymer of maleic anhydride and ethylene having a molecular weight of $8 \cdot 10^3$ to $1 \cdot 10^6$, and mixtures of such thickeners, and a non-ionic dispersant.

3. A formulation according to claim 1 which has a viscosity of 200 to $1 \cdot 10^6$ mPa·s.

4. A formulation according to claim 2 which has a viscosity of $1 \cdot 10^3$ to $1 \cdot 10^6$ mPa·s.

5. A formulation according to claim 2, wherein the thickener is a polyacrylic acid having a molecular weight of $8 \cdot 10^5$ to $1 \cdot 10^6$.

6. A formulation according to claim 1, which contains 0.01 to 10% by weight, of thickener, based on said formulation.

7. A formulation according to claim 1, which contains a non-ionic, amphoteric, cationic or anionic dispersant or a mixture of such dispersants.

8. A formulation according to claim 7, wherein the non-ionic dispersant is an ethylene oxide/propylene oxide block polymer of formula

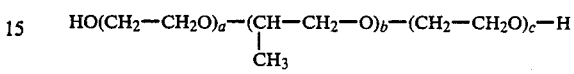

wherein the sum of the indices a and c is a number between 200 and 400 and b is a number between 20 and 100.

9. A formulation according to claim 7, wherein the anionic dispersant is a condensate of an aromatic sulfonic acid with formaldehyde such as a condensate of formaldehyde and naphthalenesulfonic acid, or a condensate of formaldehyde, naphthalenesulfonic acid and benzenesulfonic acid, or a condensate of crude cresol, formaldehyde and naphthalenesulfonic acid.

10. A formulation according to claim 7, wherein the cationic dispersant is a quaternary ammonium compound containing higher alkyl radicals and having the formula

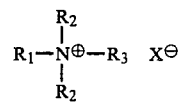

wherein
$R_1$ is a saturated or unsaturated $C_8$–$C_{22}$ alkyl radical,
$R_2$ is a $C_1$–$C_4$ alkyl redical or a polyalkylene oxide chain containing 3 to 30 ethylene oxide or propylene oxide units or ethylene oxide and styrene oxide units,
$R_3$ is a $C_1$–$C_4$ alkyl radical which is unsubstituted or substituted by a hydroxy, methoxy or ethoxy group or by a carbamoyl or phenyl radical,
$X^\ominus$ is the anion of an organic or inorganic acid containing the chloride, bromide, sulfate or methosulfate anion.

11. A formulation according to claim 1, which contains as further assistants a humectant, a hydrotropic agent, a microbicide, a fungicide, an antifoam, a chelating agent or a compound for regulating the pH.

12. A formulation according to claim 1, which contains 10 to 60% by weight, of a dye, 0.5 to 25% by weight, of a dispersant or mixture of dispersants, 0.001 to 5% by weight, of a synthetic thickener, 5 to 20% by weight of a humectant and 20 to 70% by weight of water.

13. A formulation according to claim 2, which contains 10 to 60% by weight, of a dys, 0.5 to 15% by weight, of a non-ionic dispersant, 0.1 to 5% by weight, of an anionic dispersant, 0.001 to 5% by weight, of a synthetic thickener, 5 to 20% by weight of a humectant and 20 to 70% by weight of water.

14. A formulation according to claim 13, which contains as further ingredients, in a total concentration of 0.1 to 5% by weight, an antifoam, a hydrotropic agent, a microbicide, a chelating agent or a carboxylic acid or an alkali metal hydroxide or ammonia for adjusting the pH or viscosity.

15. A process for the preparation of a dye formulation, which comprises converting a water-insoluble or sparingly water-soluble dye in the presence of a nonionic, amphoteric, cationic or anionic dispersant, or of a mixture of such dispersants, into a finely dispersed form and adding an elecroyte-sensitive thickener, or adding an electrolyte-sensitive thickener to a finely disperse dye formulation which contains a dispersant, the electrolyte-sensitive thickener being selected from the group consisting of polyacrylic acid having a molecular weight of $1 \cdot 10^5$ to $1 \cdot 10^7$, a polyacrylamide, polymethacrylamide or a homo- or copolymer of acrylamide and methacrylamide or acrylic acid having a molecular weight of $1 \cdot 10^5$ to $1 \cdot 10^7$, or a copolymer of maleic anhydride and ethylene having a molecular weight of $1 \cdot 10^3$ to $1 \cdot 10^7$, and mixtures of such thickeners.

* * * * *